United States Patent
Brown (10) Patent No.: US 9,797,271 B2
(45) Date of Patent: Oct. 24, 2017

(54) ACCESS PANEL(S) FOR AN INNER NACELLE OF A TURBINE ENGINE

(71) Applicant: Rohr, Inc., Chula Vista, CA (US)

(72) Inventor: Keith T. Brown, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 594 days.

(21) Appl. No.: 14/261,833

(22) Filed: Apr. 25, 2014

(65) Prior Publication Data

US 2015/0308291 A1  Oct. 29, 2015

(51) Int. Cl.
*F01D 25/26* (2006.01)
*B64D 29/08* (2006.01)

(52) U.S. Cl.
CPC ............. *F01D 25/26* (2013.01); *B64D 29/08* (2013.01)

(58) Field of Classification Search
CPC ................................ F01D 25/26; B64D 29/08
USPC ................... 415/200, 201; 60/226.2
See application file for complete search history.

(56) References Cited

U.S. PATENT DOCUMENTS

| | | | |
|---|---|---|---|
| 4,629,146 A | 12/1986 | Lymons | |
| 5,228,641 A | 7/1993 | Remlaoui | |
| 5,826,823 A | 10/1998 | Lymons et al. | |
| 6,170,253 B1 | 1/2001 | Newton | |
| 6,340,135 B1 | 1/2002 | Barton | |
| 7,047,725 B2 * | 5/2006 | Moe | F02C 7/045 |
| | | | 181/210 |
| 7,430,852 B2 | 10/2008 | Beutin et al. | |
| 7,946,104 B2 | 5/2011 | Frank et al. | |
| 8,109,466 B2 | 2/2012 | Aten et al. | |
| 8,128,368 B2 * | 3/2012 | Bielefedt | F03D 80/00 |
| | | | 415/201 |
| 8,181,905 B2 | 5/2012 | McDonough et al. | |
| 8,438,859 B2 * | 5/2013 | Vetters | 60/226.1 |
| 8,448,896 B2 | 5/2013 | Caruel et al. | |
| 8,523,516 B2 | 9/2013 | Vauchel et al. | |
| 8,528,857 B2 | 9/2013 | Hillereau et al. | |
| 2004/0238687 A1 * | 12/2004 | Jones | B64D 29/08 |
| | | | 244/62 |
| 2008/0072572 A1 | 3/2008 | Beutin et al. | |
| 2008/0073461 A1 | 3/2008 | Guibert et al. | |
| 2009/0175716 A1 * | 7/2009 | Vetters | F01D 25/24 |
| | | | 415/144 |
| 2010/0040466 A1 | 2/2010 | Vauchel et al. | |
| 2011/0023450 A1 | 2/2011 | Stuart et al. | |
| 2011/0116916 A1 * | 5/2011 | Porte | B64D 29/06 |
| | | | 415/201 |
| 2013/0047580 A1 | 2/2013 | Beardsley | |
| 2013/0220435 A1 | 8/2013 | James | |
| 2013/0327886 A1 | 12/2013 | James | |
| 2014/0030087 A1 | 1/2014 | Soria et al. | |

OTHER PUBLICATIONS

EP search report for EP15165172.6 dated Sep. 8, 2015.

* cited by examiner

*Primary Examiner* — Hoang Nguyen
(74) *Attorney, Agent, or Firm* — O'Shea Getz P.C.

(57) ABSTRACT

An assembly is provided for a turbine engine with an axial centerline. This turbine engine assembly includes an outer nacelle and an inner nacelle with a bypass flowpath radially therebetween. The inner nacelle includes a nacelle wall and at least one access panel, which is adapted to at least partially cover an aperture in the nacelle wall. The outer nacelle axially overlaps the access panel.

11 Claims, 7 Drawing Sheets

ACCESS PANEL(S) FOR AN INNER NACELLE OF A TURBINE ENGINE

BACKGROUND OF THE INVENTION

1. Technical Field

This disclosure relates generally to a nacelle for a turbine engine and, more particularly, to panels for covering and providing access to components within a turbine engine nacelle.

2. Background Information

A turbine engine propulsion system for a commercial aircraft typically includes a fan section, a compressor section, a combustor section and a turbine section. The fan section may be housed within an outer fan nacelle. The compressor section, the combustor section and the turbine section may be collectively housed within an inner core nacelle, which may also be referred to as an inner fixed structure (IFS). This inner fixed structure may include one or more panels or hatches that move to expose components of the compressor section, the combustor section and the turbine section. Such panels, however, may have complex opening mechanisms and therefore may be costly to manufacture.

There is a need in the art for improved access panels for a turbine engine nacelle.

SUMMARY OF THE DISCLOSURE

According to an aspect of the invention, an assembly is provided for a turbine engine with an axial centerline. This turbine engine assembly includes an outer nacelle and an inner nacelle with a bypass flowpath radially therebetween. The inner nacelle includes a nacelle wall and at least one access panel, which access panel is adapted to at least partially cover an aperture in the nacelle wall. The outer nacelle axially overlaps the access panel.

According to another aspect of the invention, an inner nacelle is provided for housing a turbine engine core and for forming a bypass flowpath with an outer nacelle. The inner nacelle includes an inner nacelle wall and a plurality of access panels attached to the nacelle wall. The access panels are adapted to collectively cover an aperture in the nacelle wall.

At least some of the access panels may be arranged circumferentially around a centerline. At least some of the access panels may also or alternatively be arranged axially along the centerline.

A bifurcation may extend radially between the outer nacelle and the inner nacelle. The outer nacelle, the inner nacelle and/or the bifurcation may form an O-duct through which the bypass flowpath axially extends.

The nacelle wall may have an outer surface that extends axially along and extends at least three hundred and twenty degrees (320°) around the centerline.

The nacelle wall may extend axially along the centerline. The aperture may extend axially within and radially through the nacelle wall.

The nacelle wall may extend axially along the centerline. The aperture may extend circumferentially within and radially through the nacelle wall.

The access panel may extend circumferentially to a panel side. The access panel may be hinged to the nacelle wall at the panel side. The access panel, for example, may be hinged to the nacelle wall on, adjacent or proximate the panel side.

The access panel may be removably fastened to the nacelle wall.

A second access panel may be adapted to partially cover the aperture in the nacelle wall. The access panel and the second access panel may be arranged along the centerline.

A second access panel may be adapted to partially cover the aperture in the nacelle wall. The access panel and the second access panel may be arranged around the centerline.

A second access panel may be attached to the nacelle wall. The second access panel may be adapted to at least partially cover a second aperture in the nacelle wall.

The outer nacelle may include a sleeve adapted to move axially between a forward position and an aft position. The sleeve may axially overlap the access panel in the forward position.

The aperture in the inner nacelle may be substantially axially aligned with an aperture in the outer nacelle that extends axially between a fixed portion of the outer nacelle and the sleeve in the aft position.

The outer nacelle may include a thrust reverser cascade that axially overlaps the access panel.

The access panel may be configured as a noise attenuation panel.

The foregoing features and the operation of the invention will become more apparent in light of the following description and the accompanying drawings.

DETAILED DESCRIPTION OF THE INVENTION

Figure 1:
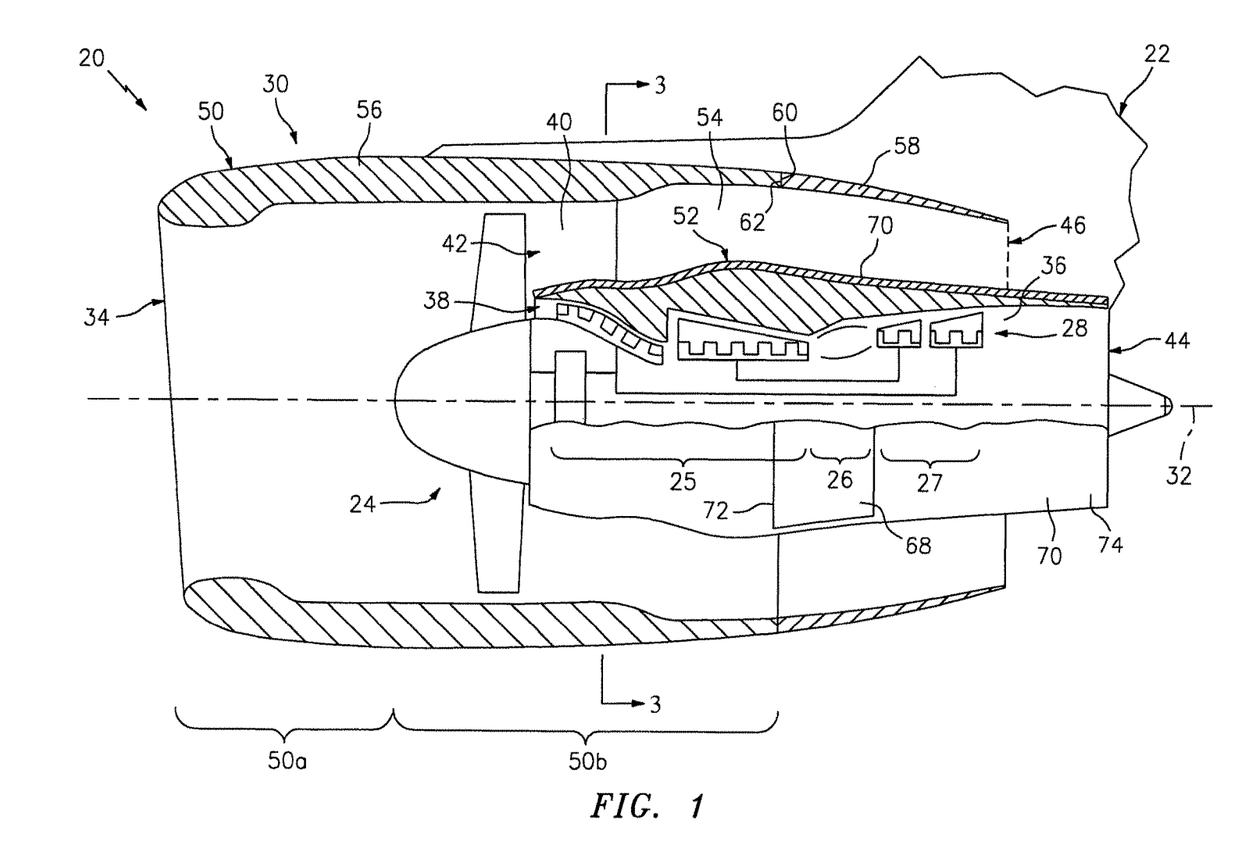
FIGS. 1 and 2 are side cutaway illustrations of a geared turbine engine configured with an engine pylon.

FIG. 1 is a side cutaway illustration of a geared turbine engine 20 (e.g., a geared turbofan engine) configured as or included in a propulsion system for an aircraft. The turbine engine 20 is connected to an engine pylon 22, which may connect the turbine engine 20 to the aircraft. The engine pylon 22, for example, may connect the turbine engine 20 to a wing or a fuselage of the aircraft.

The turbine engine 20 includes a fan section 24 and a turbine engine core 28. The engine core 28 includes a compressor section 25, a combustor section 26 and a turbine section 27. The turbine engine 20 also includes a turbine engine housing 30.

The engine sections 24-27 are arranged sequentially along an axial centerline 32 of the turbine engine 20 within the engine housing 30. The compressor section 25 includes a low pressure compressor (LPC) section and a high pressure compressor (HPC) section. The turbine section 27 includes a high pressure turbine (HPT) section and a low pressure turbine (LPT) section.

During operation, air enters the turbine engine 20 through a forward engine inlet 34. This air is directed through the fan section 24 and into (i) a core flowpath 36 through a forward core inlet 38 and into (ii) a bypass flowpath 40 through a bypass inlet 42. The air within the core flowpath 36 may be referred to as "core air". The air within the bypass flowpath 40 may be referred to as "bypass air". The core air is directed through the engine sections 25-27 and exits the turbine engine 20 through an aft core exhaust 44 to provide forward engine thrust. Within the combustor section 26, fuel is injected into and mixed with the core air and ignited to power the turbine engine 20. The bypass air is directed through the bypass flowpath 40 and may exit the turbine engine 20 through an aft bypass exhaust 46 to provide additional forward engine thrust. Alternatively, referring to FIG. 2, some or all of the bypass air may exit the turbine engine 20 through a thrust reverser 48 to provide reverse engine thrust.

Figure 2:
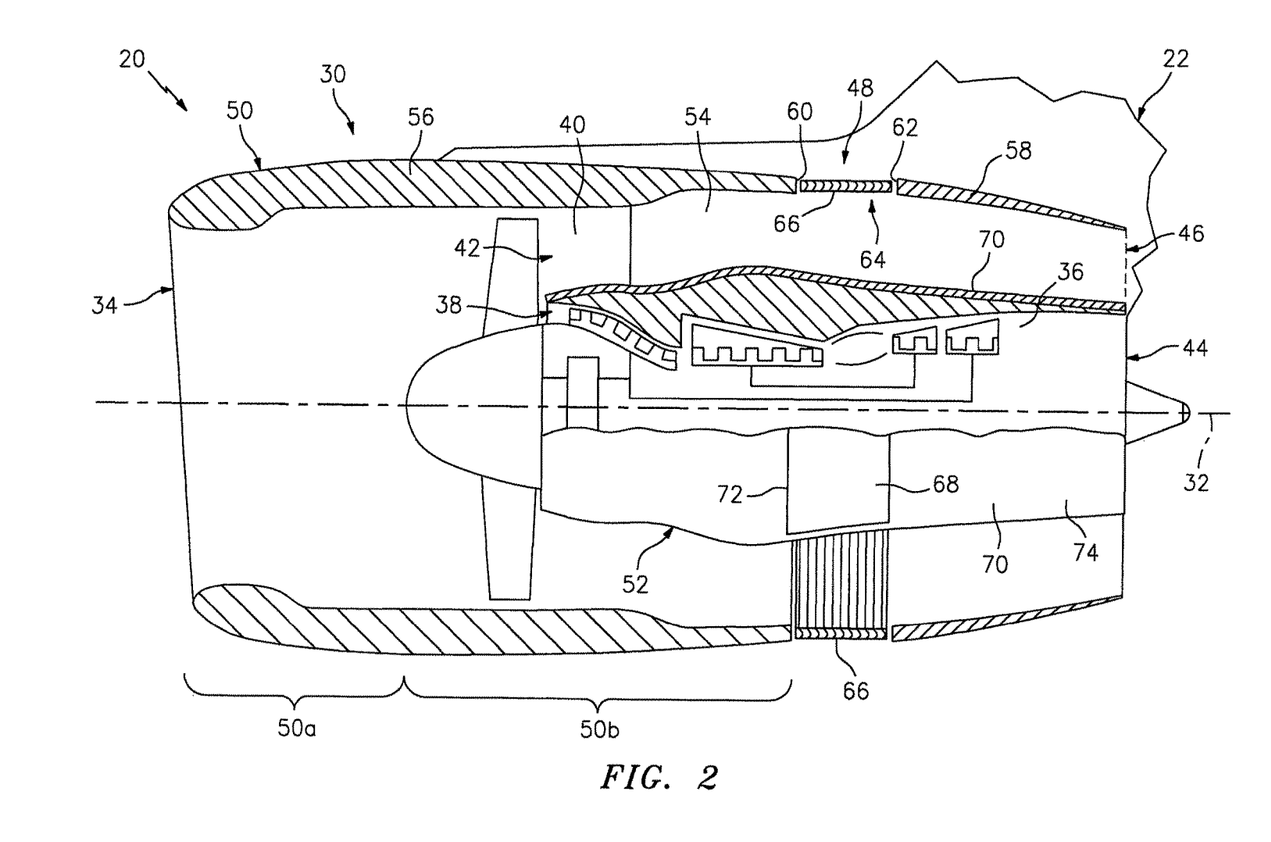

Referring to FIGS. 1 and 2, the engine housing 30 includes an outer nacelle 50 (e.g., a fan nacelle) and an inner nacelle 52 (e.g., a core nacelle), which inner nacelle 52 may also be referred to as an "inner fixed structure" or "IFS". The engine housing 30 also includes a bifurcation 54.

The bifurcation 54 extends radially between the outer nacelle 50 and the inner nacelle 52 and may be configured as part of the engine pylon 22. With this configuration, the outer nacelle 50, the inner nacelle 52 and the bifurcation 54 may form an O-duct that defines and through which the bypass flowpath 40 axially extends (see also FIG. 3). The term "O-duct" may be used to describe a duct that forms a flowpath which extends at least 5.6 radians (~320 degrees) around a centerline between, for example, opposing surfaces of a bifurcation.

The outer nacelle 50 extends axially along the centerline 32 between the engine inlet 34 and the bypass exhaust 46. The outer nacelle 50 extends circumferentially around and houses the fan section 24.

The outer nacelle 50 includes the thrust reverser 48, a forward fixed portion 56 and an aft movable portion 58, which may be configured as and is referred to below as a translating sleeve. The fixed portion 56 and the translating sleeve 58 each have a generally tubular geometry. The fixed portion 56 extends axially to an aft end 60 from, for example, the engine inlet 34. The fixed portion may include an inlet 50a and a fan cowl 50b. The translating sleeve 58 extends axially to a forward end 62 from, for example, the bypass exhaust 46.

The translating sleeve 58 is adapted to move axially between a forward position (see FIG. 1) and an aft position (see FIG. 2). In the forward position of FIG. 1, the forward end 62 of the translating sleeve 58 is adjacent and may abut the aft end 60 of the fixed portion 56 (e.g., the fan cowl 50b). In the aft position of FIG. 2, in contrast, the translating sleeve 58 forms at least one aperture 64 with the fixed portion 56. This aperture 64 extends axially from the aft end 60 of the fixed portion 56 to the forward end 62 of the translating sleeve 58. With this configuration, some or substantially all of the bypass air may flow through the aperture 64 and one or more (e.g., an array of) thrust reverser cascades 66 within the aperture 64 to provide the reverse engine thrust described above.

The inner nacelle 52 extends axially along the centerline 32 between the inlets 38 and 42 and the core exhaust 44. The inner nacelle 52 extends circumferentially around and houses the engine sections 25-27 (see FIG. 1); e.g., the engine core 28. A forward portion of the inner nacelle 52 is axially aligned with and arranged radially within an aft portion of the outer nacelle 50, thereby forming the bypass flowpath 40 as well as its inlet 42 and exhaust 46 radially between the nacelles 50 and 52.

The inner nacelle 52 includes one or more access panels 68 and a generally tubular inner nacelle wall 70. Each of the access panels 68 is adapted to cover a respective aperture 72 in the nacelle wall 70, and defines a radial inner boundary portion of the bypass flowpath 40. One or more of the access panels 68 may each be substantially axially aligned with and/or axially overlapped by the translating sleeve 58 (see FIG. 1) and/or the thrust reverser 48 and more particularly the cascade(s) 66 (see FIG. 2). Each of the access panels 68 is attached to the nacelle wall 70. Each of the access panels 68, for example, may be removably fastened to the nacelle wall 70 with one or more fasteners; e.g., bolts, latches, etc. With this configuration, the access panels 68 may be removed completely from the nacelle wall 70 (or otherwise opened as described below) to expose the apertures 72 in the inner nacelle 52.

Figure 3:
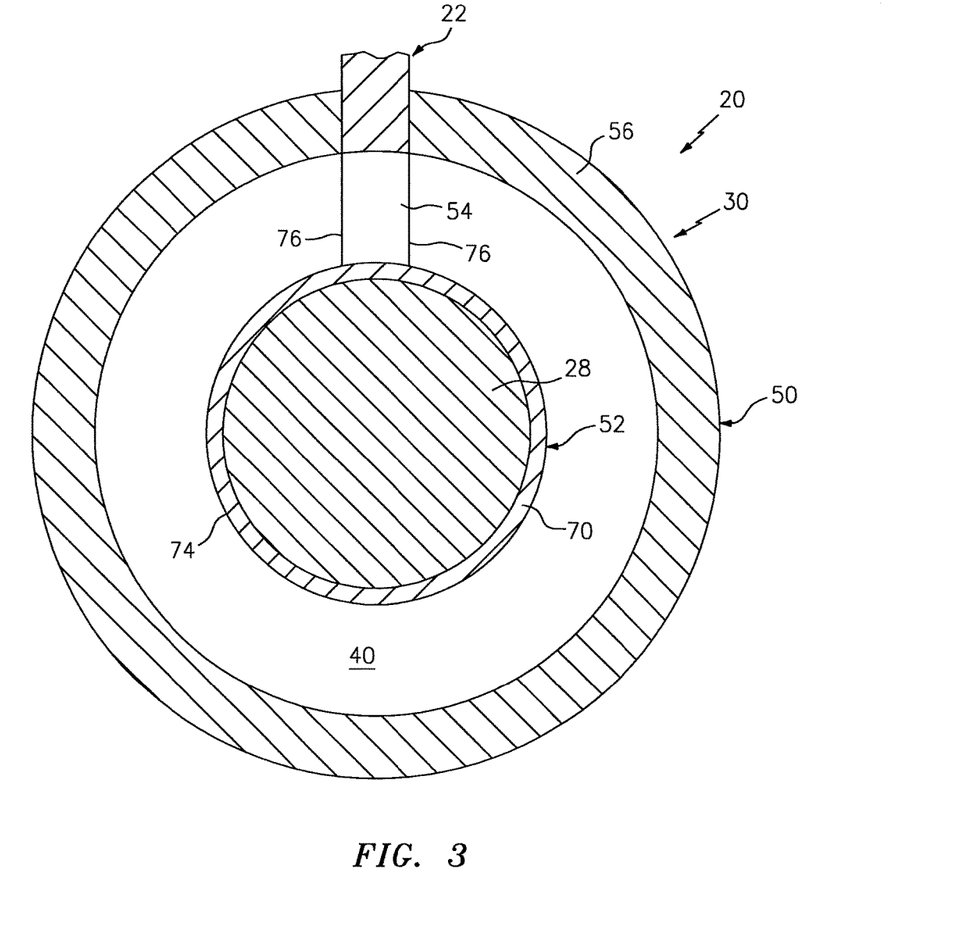
FIG. 3 is a cross-sectional illustration of the turbine engine and the engine pylon of FIG. 1.

The nacelle wall 70 has an outer surface 74 that extends axially along the centerline 32 from, for example, the inlets 38 and 42 to the core exhaust 44. Referring to FIG. 3, at least a portion of the outer surface 74 also extends at least about 5.6 radians (~320 degrees) around the centerline 32 between, for example, opposing surfaces 76 of the bifurcation 54.

Figure 4:
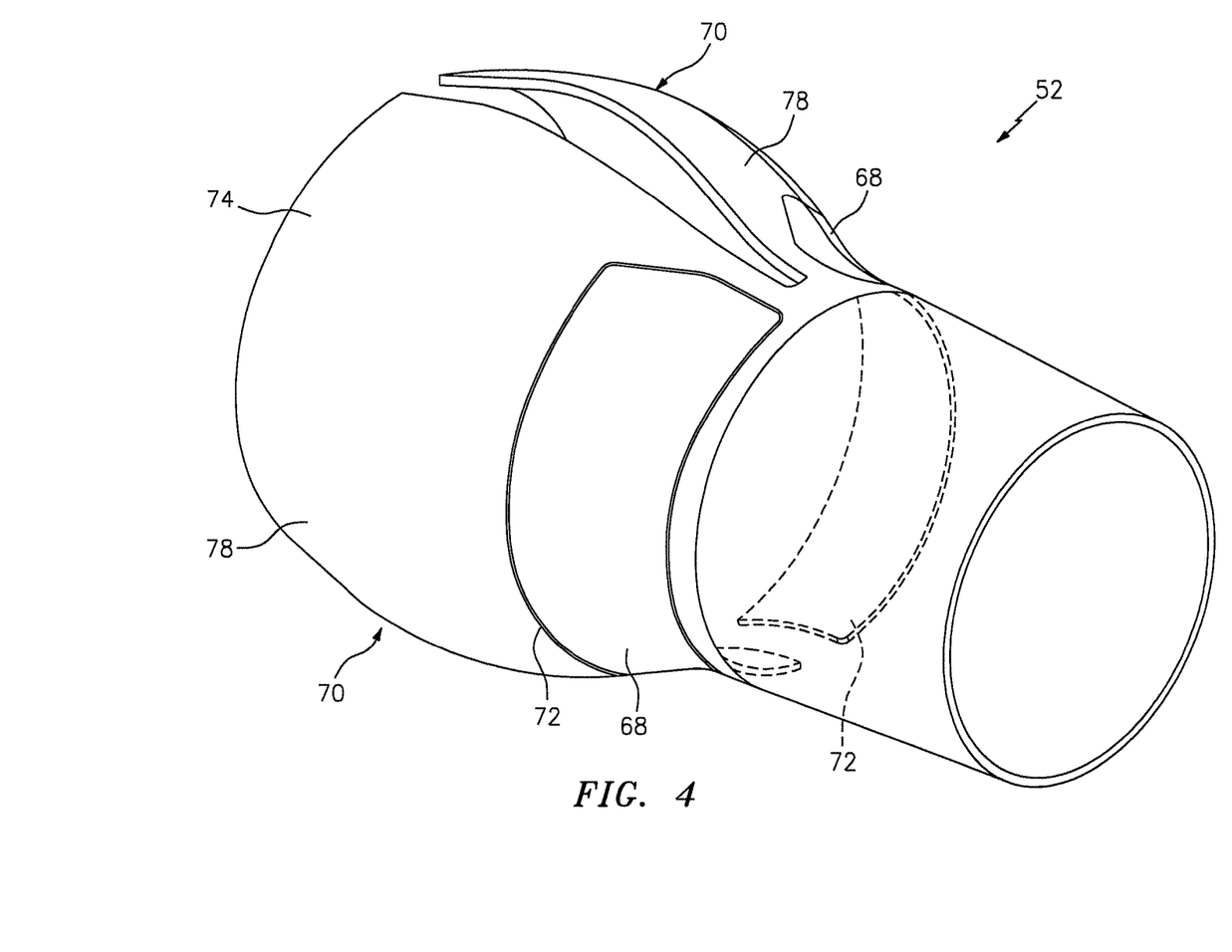
FIG. 4 is a partial perspective illustration of an inner nacelle for the turbine engine of FIGS. 1 and 2.

Referring to FIG. 4, the nacelle wall 70 may be configured from one or more circumferential wall segments 78 (e.g., generally semi-tubular wall segments), which may collectively define the outer surface 74. One or more of the wall segments 78 may each include at least one of the apertures 72. This aperture 72 may extend axially and/or circumferentially within its respective wall segment 78. The aperture 72 also extends radially through its respective wall segment 78, which provides access to one or more engine core 28 components housed within the inner nacelle 52 when the respective access panel 68 is removed (or otherwise opened). Referring to FIG. 2, the aperture 72 may also be substantially axially aligned with and/or axially overlapped by the aperture 64 in the outer nacelle 50. In this manner, after moving the translating sleeve 58 to the aft position and either hinging open, sliding back or removing the cascade(s) 66, a technician may remove (or otherwise open) one or more of the access panels 68 and access the engine core 28 component(s) housed within the inner nacelle 52 for inspection and/or maintenance.

Figure 5:
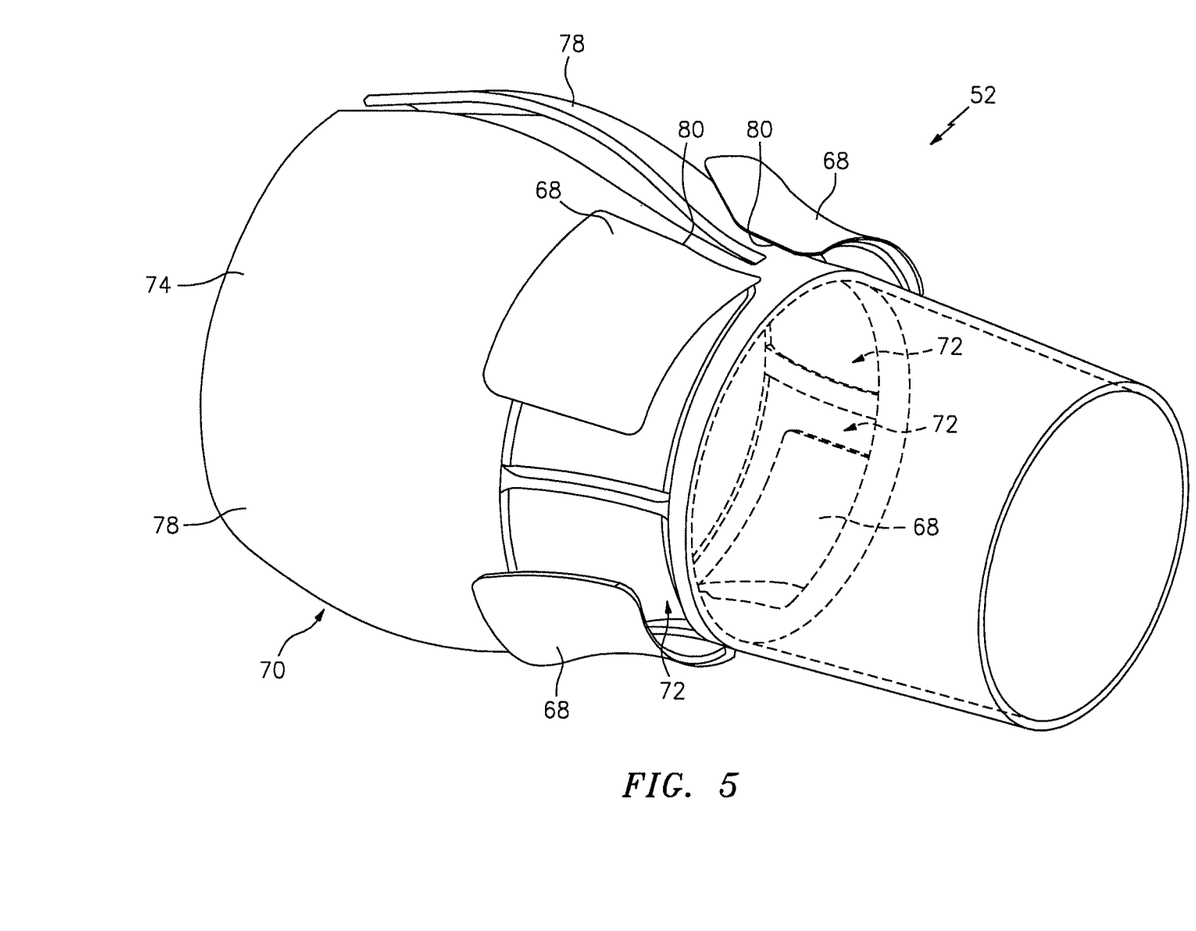
FIGS. 5-7 are partial perspective illustrations of alternate embodiment inner nacelles for the turbine engine of FIGS. 1 and 2.

In some embodiments, referring to FIG. 5, one or more of the wall segments 78 may each include a plurality of the apertures 72. Each of these apertures 72 may be covered by at least one of the access panels 68.

In some embodiments, one or more of the access panels 68 may each be movably attached to the nacelle wall 70. For example, each of the access panels 68 of FIG. 5 is pivotally hinged to the nacelle wall 70 at (e.g., on, adjacent or proximate) a circumferential end 80 thereof. With this configuration, the access panels 68 may pivot open to expose the apertures 72. Of course, one or more of the access panels 68 may be removably and/or movably attached to the nacelle wall 70 in other manners than described above. For example, one or more of the access panels 68 may be adapted to axially and/or circumferentially slide to expose its aperture 72.

Figure 6:
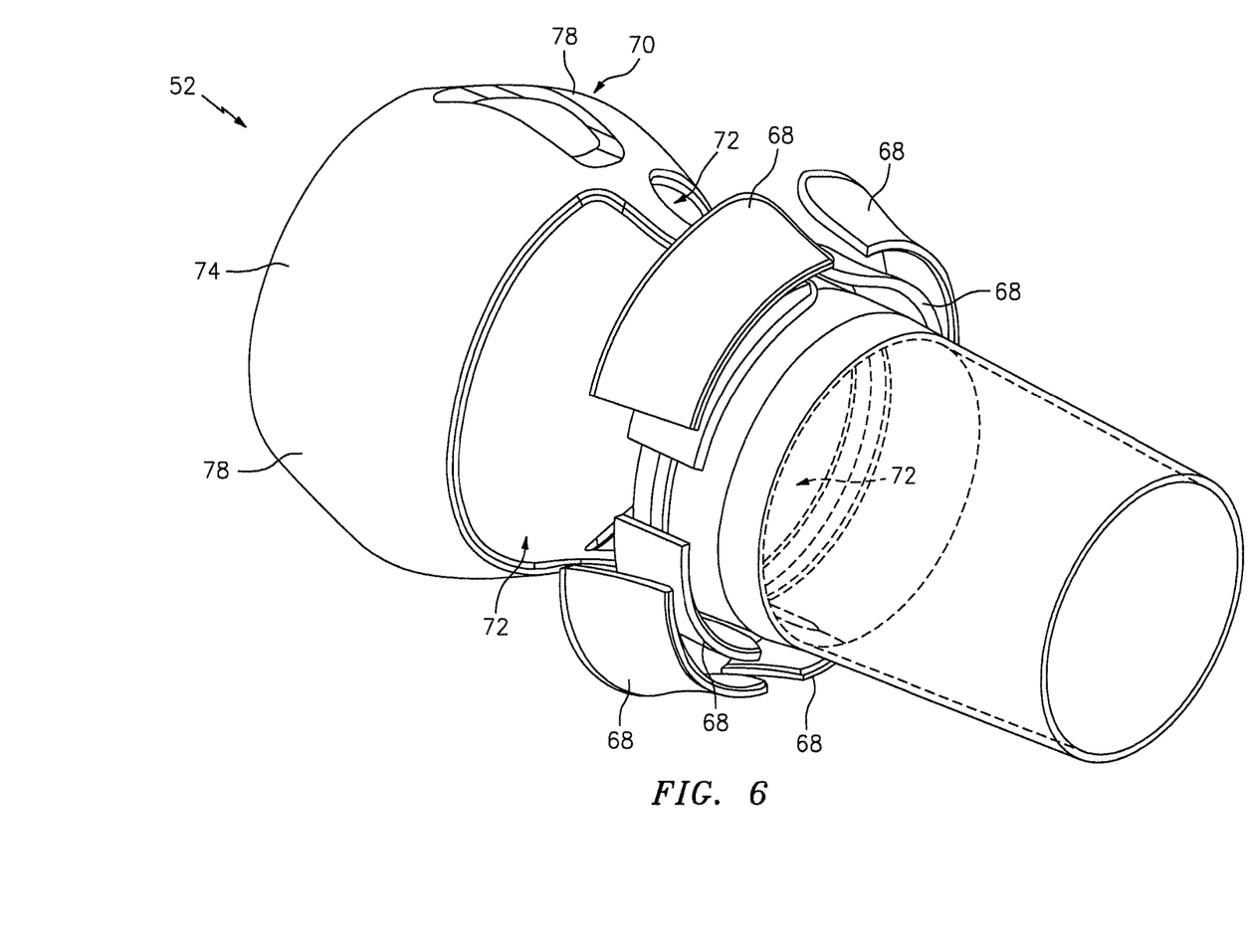

In some embodiments, referring to FIG. 6, a plurality of the access panels 68 may be configured together to collectively cover a respective one of the apertures 72. Thus, each of the access panels 68 partially covers its aperture 72. These access panels 68 may be arranged axially along the centerline 32. The access panels 68 may also or alternatively be arranged circumferentially around the centerline 32.

Figure 7:
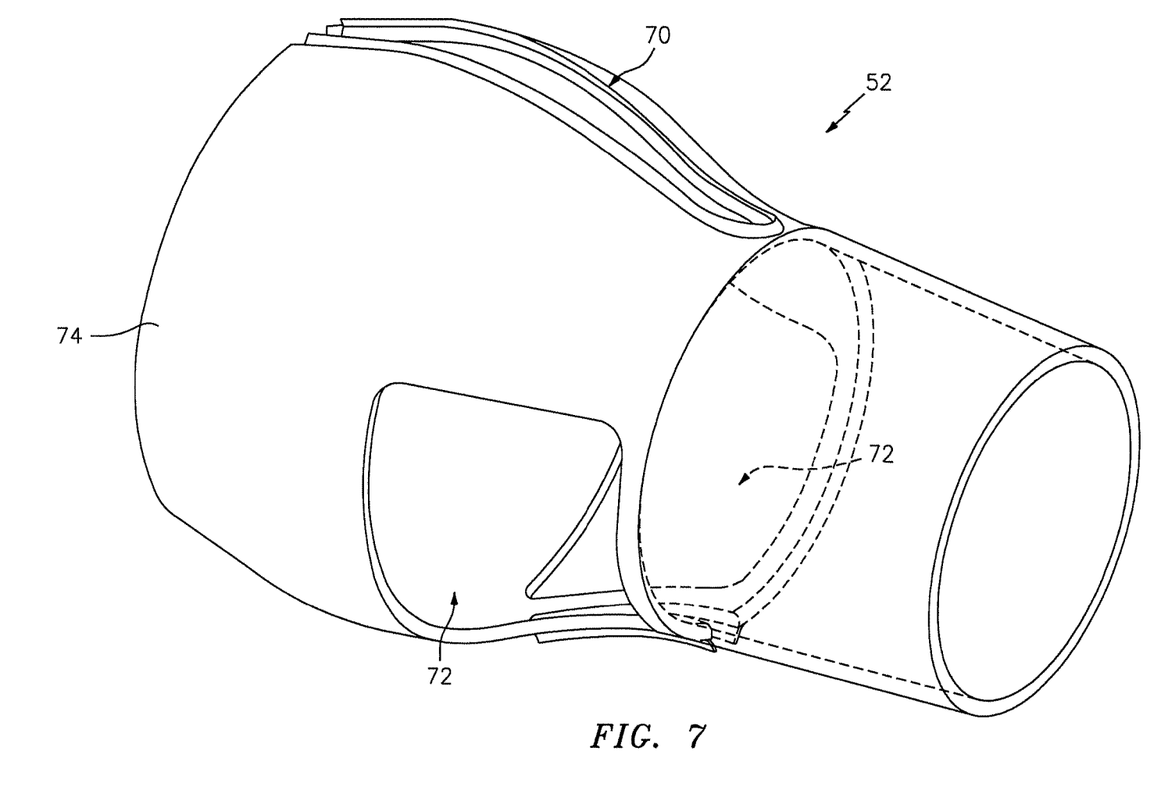

In some embodiments, one or more of the apertures 72 may each extend circumferentially between about 2.1 radians (~120 degrees) and about 3.4 radians (~180 degrees) within the nacelle wall 70. In some embodiments, referring to FIG. 7, one or more of the apertures 72 may each extend circumferentially between about 1.0 radians (~60 degrees)

and about 1.6 radians (~90 degrees) within the nacelle wall 70. The inner nacelle 52, however, is not limited to the foregoing exemplary aperture geometries. Sizes, shapes and locations of the apertures and panels, for example, may be changed for the particular access requirements that each individual application requires for maintenance.

The inner nacelle 52 may have various configurations other than those described above and illustrated in the drawings. For example, the nacelle wall 70 may be configured from one or more axial wall segments 78; e.g., a plurality of generally tubular wall segments. The nacelle wall 70 may be configured with a single one of the apertures 72. One or more of the apertures 72 may each extend axially into the nacelle wall 70 and/or circumferentially into its respective wall segment 78. The present invention therefore is not limited to any particular inner nacelle or engine housing configurations.

In some embodiments, for maintenance and/or safety reasons, a lanyard may be attached between the nacelle side wall and access panel. This lanyard may serve to ensure that the panel is secured during reassembly after a maintenance action.

In some embodiments, one or more of the access doors may also each be configured as noise attenuating panels; e.g., acoustic panels. Such a noise attenuating panel is adapted to attenuate engine noise while still providing access to within the inner nacelle (e.g., inner fixed structure). Each panel, for example, may include a honeycomb core connected between an outward facing perforated skin and an inward facing non-perforated skin.

The inner nacelle 52 may be included in various turbine engines other than the one described above. The inner nacelle 52, for example, may be included in a geared turbine engine where a gear train connects one or more shafts to one or more rotors in a fan section, a compressor section and/or any other engine section. Alternatively, the inner nacelle 52 may be included in a turbine engine configured without a gear train. The inner nacelle 52 may be included in a geared or non-geared turbine engine configured with a single spool, with two spools (e.g., see FIG. 1), or with more than two spools. The turbine engine may be configured as a turbofan engine, a turbojet engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine with an axial centerline, the assembly comprising:
   an outer nacelle and an inner nacelle with a bypass flowpath radially therebetween;
   the inner nacelle including a nacelle wall, at least one first access panel adapted to at least partially cover a first aperture in the nacelle wall, and at least one second access panel adapted to at least partially cover a second aperture in the nacelle wall;
   wherein the outer nacelle axially overlaps the access panel;
   wherein the first access panel extends circumferentially to a top panel side, and the first access panel is hinged to the nacelle wall at the top panel side; and
   wherein the second access panel extends circumferentially to a bottom panel side, and the second access panel is hinged to the nacelle wall at the bottom panel side.

2. The assembly of claim 1, further comprising:
   a bifurcation extending radially between the outer nacelle and the inner nacelle;
   wherein the outer nacelle, the inner nacelle and the bifurcation form an O-duct through which the bypass flowpath axially extends.

3. The assembly of claim 1, wherein the nacelle wall has an outer surface that extends axially along and at least three hundred and twenty degrees around the centerline.

4. The assembly of claim 1, wherein
   the nacelle wall extends axially along the centerline; and
   the first aperture extends axially within and radially through the nacelle wall.

5. The assembly of claim 1, wherein
   the nacelle wall extends axially along the centerline; and
   the first aperture extends circumferentially within and radially through the nacelle wall.

6. An assembly for a turbine engine with an axial centerline, the assembly comprising:
   an outer nacelle and an inner nacelle with a bypass flowpath radially therebetween;
   the inner nacelle including a nacelle wall and an access panel adapted to at least partially cover an aperture in the nacelle wall;
   wherein the outer nacelle includes a thrust reverser cascade that axially overlaps the access panel;
   wherein the outer nacelle axially overlaps the access panel; and
   wherein the access panel is removably fastened to the nacelle wall.

7. The assembly of claim 1, further comprising a third access panel attached to the nacelle wall, the third access panel adapted to at least partially cover a third aperture in the nacelle wall, wherein the third access panel extends circumferentially to a panel side, and the third access panel is hinged to the nacelle wall at the panel side.

8. The assembly of claim 1, wherein
   the outer nacelle includes a sleeve adapted to move axially between a forward position and an aft position; and
   the sleeve axially overlaps the access panel in the forward position.

9. The assembly of claim 8, wherein the first aperture in the inner nacelle is substantially axially aligned with an aperture in the outer nacelle that extends axially between a fixed portion of the outer nacelle and the sleeve in the aft position.

10. The assembly of claim 1, wherein the outer nacelle includes a thrust reverser cascade that axially overlaps the access panel.

11. An assembly for a turbine engine with an axial centerline, the assembly comprising:
   an outer nacelle and an inner nacelle with a bypass flowpath radially therebetween;
   the inner nacelle including a nacelle wall, a first access panel adapted to at least partially cover a first aperture in the nacelle wall, and a second access panel adapted to at least partially cover a second aperture in the nacelle wall;

wherein the first access panel is on a first side of the nacelle and is configured to slide to at least partially expose the first aperture;

wherein the second access panel is on a second side of the nacelle, which is opposite the first side of the nacelle, and is configured to slide to at least partially expose the second aperture; and wherein the outer nacelle axially overlaps the first aperture and the second aperture.

\* \* \* \* \*